(12) United States Patent
Vasseur et al.

(10) Patent No.: US 10,097,471 B2
(45) Date of Patent: Oct. 9, 2018

(54) TIME-BASED TRAFFIC ENGINEERING FOR SEASONAL FLOWS IN A NETWORK

(71) Applicant: Cisco Technology, Inc., San Jose, CA (US)

(72) Inventors: Jean-Philippe Vasseur, Anchorage, AK (US); Pascal Thubert, La Colle sur Loup (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 14/876,000

(22) Filed: Oct. 6, 2015

(65) Prior Publication Data
US 2017/0099226 A1  Apr. 6, 2017

(51) Int. Cl.
*H04L 12/851* (2013.01)
*H04L 12/911* (2013.01)

(52) U.S. Cl.
CPC ........ *H04L 47/2425* (2013.01); *H04L 47/826* (2013.01)

(58) Field of Classification Search
CPC .... H01Q 1/1242; H01Q 1/246; H04L 47/127; H04L 41/0893; H04L 41/0896; H04L 41/32; H04L 43/0876; H04L 47/12; H04L 47/2425; H04L 47/2483; H04L 47/826; H04W 16/04; H04W 88/085; H04W 16/00; H04W 16/22; G06F 17/27; G08G 1/081
See application file for complete search history.

(56) References Cited

U.S. PATENT DOCUMENTS

| | | | |
|---|---|---|---|
| 6,363,053 B1 * | 3/2002 | Schuster | H04L 41/5003 370/230 |
| 8,121,036 B2 | 2/2012 | Liu et al. | |
| 8,204,986 B2 * | 6/2012 | Wexler | H04L 43/0858 709/224 |
| 8,270,429 B2 | 9/2012 | Chen et al. | |
| 8,472,328 B2 | 6/2013 | Gopalan et al. | |
| 8,892,737 B2 * | 11/2014 | Wexler | G06F 9/505 709/223 |
| 2005/0097206 A1 * | 5/2005 | Rabinovitch | H04L 41/5003 709/224 |

(Continued)

OTHER PUBLICATIONS

Novel Routing Approach for the TSCH Mode of IEEE 802.15.14e in Wireless Sensor Networks with Mobile Nodes, MArc Barcelo et al, Dec. 4, 2014.*

(Continued)

*Primary Examiner* — Ninos Donabed
(74) *Attorney, Agent, or Firm* — Parker Ibrahim & Berg LLP; James M. Behmke; Stephen D. LeBarron

(57) ABSTRACT

In one embodiment, a device in a network receives information regarding one or more traffic flows in the network. The device identifies a particular one of the one or more traffic flows as a seasonal traffic flow based on the information regarding the one or more traffic flows. The device determines whether a service level agreement associated with the seasonal traffic flow is met. The device causes a time-based path for the seasonal traffic flow to be provisioned, in response to a determination that the service level agreement associated with the seasonal traffic flow is not met.

15 Claims, 19 Drawing Sheets

(56) References Cited

U.S. PATENT DOCUMENTS

| | | | | |
|---|---|---|---|---|
| 2007/0208852 A1* | 9/2007 | Wexler | ................... | G06F 9/505 |
| | | | | 709/224 |
| 2009/0031022 A1* | 1/2009 | Wexler | ................ | H04L 43/0864 |
| | | | | 709/224 |
| 2009/0216910 A1* | 8/2009 | Duchesneau | ......... | G06F 9/5072 |
| | | | | 709/250 |
| 2012/0030319 A1* | 2/2012 | Andries | .............. | H04L 41/5009 |
| | | | | 709/220 |
| 2012/0147744 A1* | 6/2012 | Lee | ......................... | H04L 47/20 |
| | | | | 370/230 |
| 2013/0275568 A1* | 10/2013 | Nguyen | .............. | H04L 41/0806 |
| | | | | 709/223 |
| 2013/0339545 A1* | 12/2013 | Shenoi | .............. | H04L 12/40163 |
| | | | | 709/240 |
| 2014/0129734 A1* | 5/2014 | Vasseur | ................ | H04L 45/121 |
| | | | | 709/241 |
| 2015/0095445 A1* | 4/2015 | Thankappan | ......... | H04L 45/125 |
| | | | | 709/214 |
| 2015/0193696 A1 | 7/2015 | Vasseur et al. | | |
| 2015/0333969 A1* | 11/2015 | Vasseur | ................... | H04L 41/16 |
| | | | | 709/224 |
| 2015/0333994 A1* | 11/2015 | Gell | .................... | H04L 43/0882 |
| | | | | 709/224 |
| 2016/0218948 A1* | 7/2016 | Djukic | ................ | H04L 43/0876 |

OTHER PUBLICATIONS

Thubert, et al., "An Architecture for IPv6 over the TSCH Mode of IEEE 802.15.4e", Internet Draft, draft-ietf-6tisch-architecture-05, Jan. 27, 2015, 40 pages, IETF Trust.

* cited by examiner

TIME-BASED TRAFFIC ENGINEERING FOR SEASONAL FLOWS IN A NETWORK

TECHNICAL FIELD

The present disclosure relates generally to computer networks, and, more particularly, to time-based traffic engineering for seasonal flows in a network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
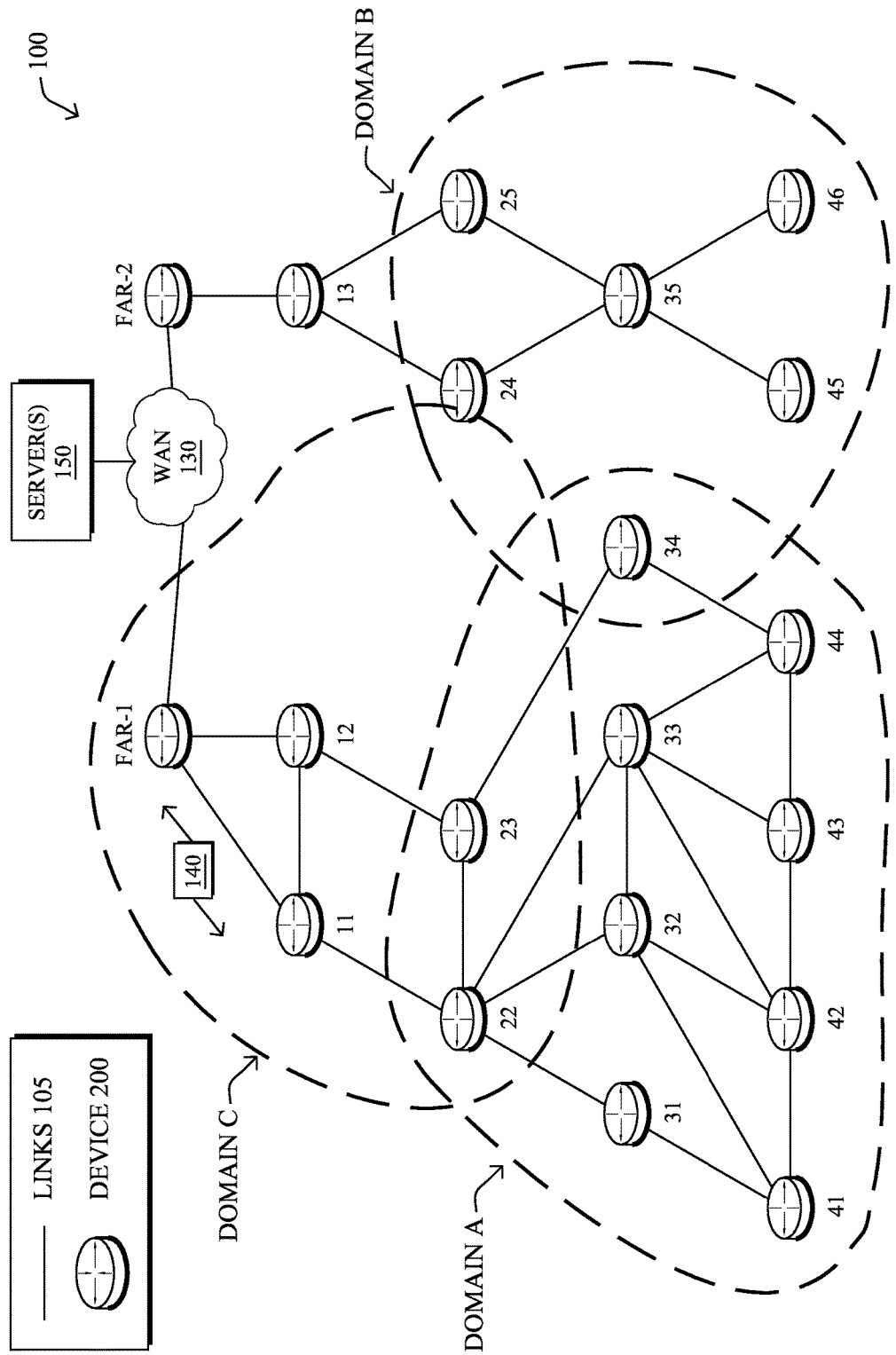
FIG. 1 illustrates an example communication network.

According to one or more embodiments of the disclosure, a device in a network receives information regarding one or more traffic flows in the network. The device identifies a particular one of the one or more traffic flows as a seasonal traffic flow based on the information regarding the one or more traffic flows. The device determines whether a service level agreement associated with the seasonal traffic flow is met. The device causes a time-based path for the seasonal traffic flow to be provisioned, in response to a determination that the service level agreement associated with the seasonal traffic flow is not met.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
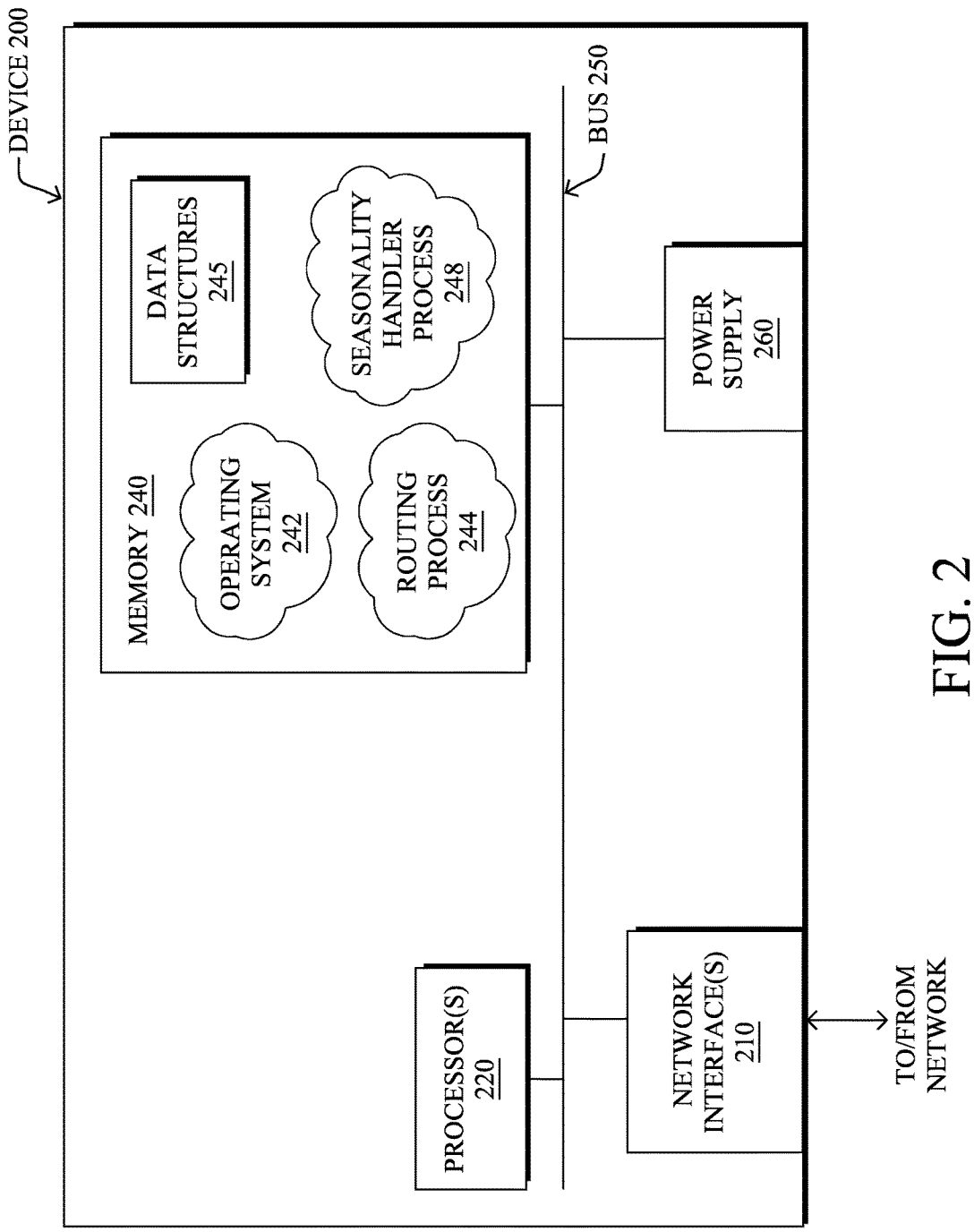
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative seasonality handler process 248 as described in greater detail below. Note that while seasonality handler process 248 is shown in centralized memory 240, alternative embodiments provide for the process to be specifically operated within the network interfaces 210, such as within a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

According to various embodiments, seasonality handler process 248 may be configured to perform the operations described herein with respect to seasonal traffic flows. For example, seasonality handler process 248 may be configured to identify seasonal traffic flows (e.g., traffic flows that only appear at certain times in the network), determine whether the seasonal traffic flows satisfy any associated service level agreements (SLAs) that define the acceptable characteristics of the flow, and/or implement any configuration changes in the network, should a seasonal traffic flow not satisfy its SLA or otherwise not satisfy a performance-based rule.

In some embodiments, seasonality handler process 248 may use machine learning to identify seasonal traffic flows. Generally, machine learning is concerned with the design and the development of processing techniques that take as input empirical data (e.g., network statistics and performance indicators) and recognize complex patterns in these data. These patterns can then be used to make decisions automatically (e.g., via close-loop control) or to help make decisions. Machine learning is a very broad discipline used to tackle very different problems (e.g., computer vision, robotics, data mining, search engines, etc.), but the most common tasks are as follows: linear and non-linear regression, classification, clustering, dimensionality reduction, anomaly detection, optimization, association rule learning.

One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c, with the associated cost function indicating the number of misclassified points. During operation, the machine learning process may adjust the parameters a, b, and c, to minimize the cost function and the number of misclassified points. After this optimization phase (or learning phase), the model M can be used to classify new data points. Often, M is a statistical model, and the cost function is inversely proportional to the likelihood of M, given the input data.

Learning machines are computational entities that rely on one or more machine learning techniques to perform a task for which they have not been explicitly programmed to perform. In particular, they are capable of adjusting their behavior to their environment. In some cases, seasonality handler process 248 may be configured as a learning machine that uses any, or all, of the following machine learning techniques: artificial neural networks (ANN), support vector machines (SVM), naive Bayes, decision trees, and the like. In some cases, a learning network may even employ hierarchical classifiers (e.g., a hierarchy of ANNs), to ultimately classify data. Seasonality handler process 248 may also employ the use of time series models such as autoregressive moving average models (ARMAs) or autoregressive integrated moving average models (ARIMAs).

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
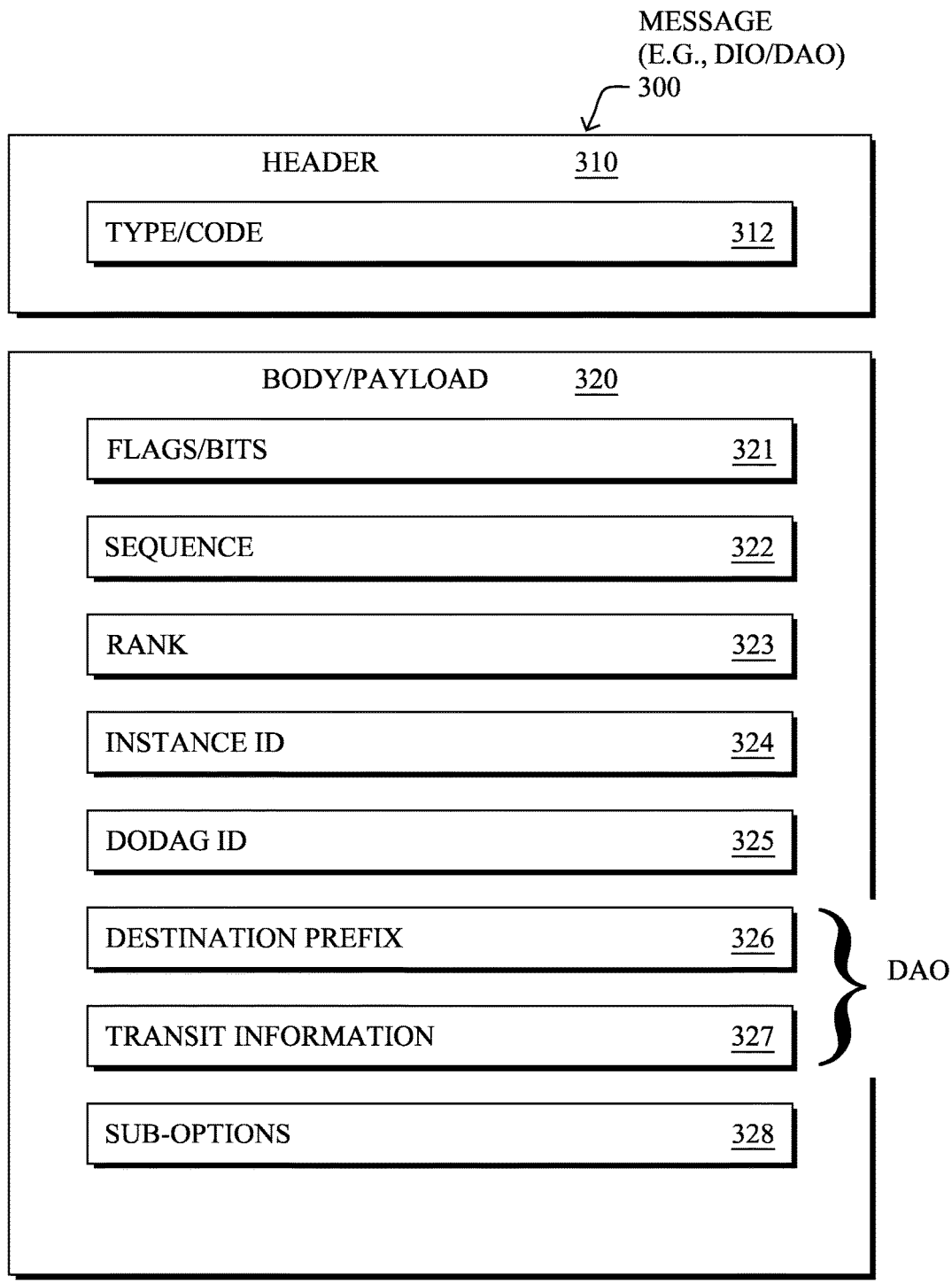
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
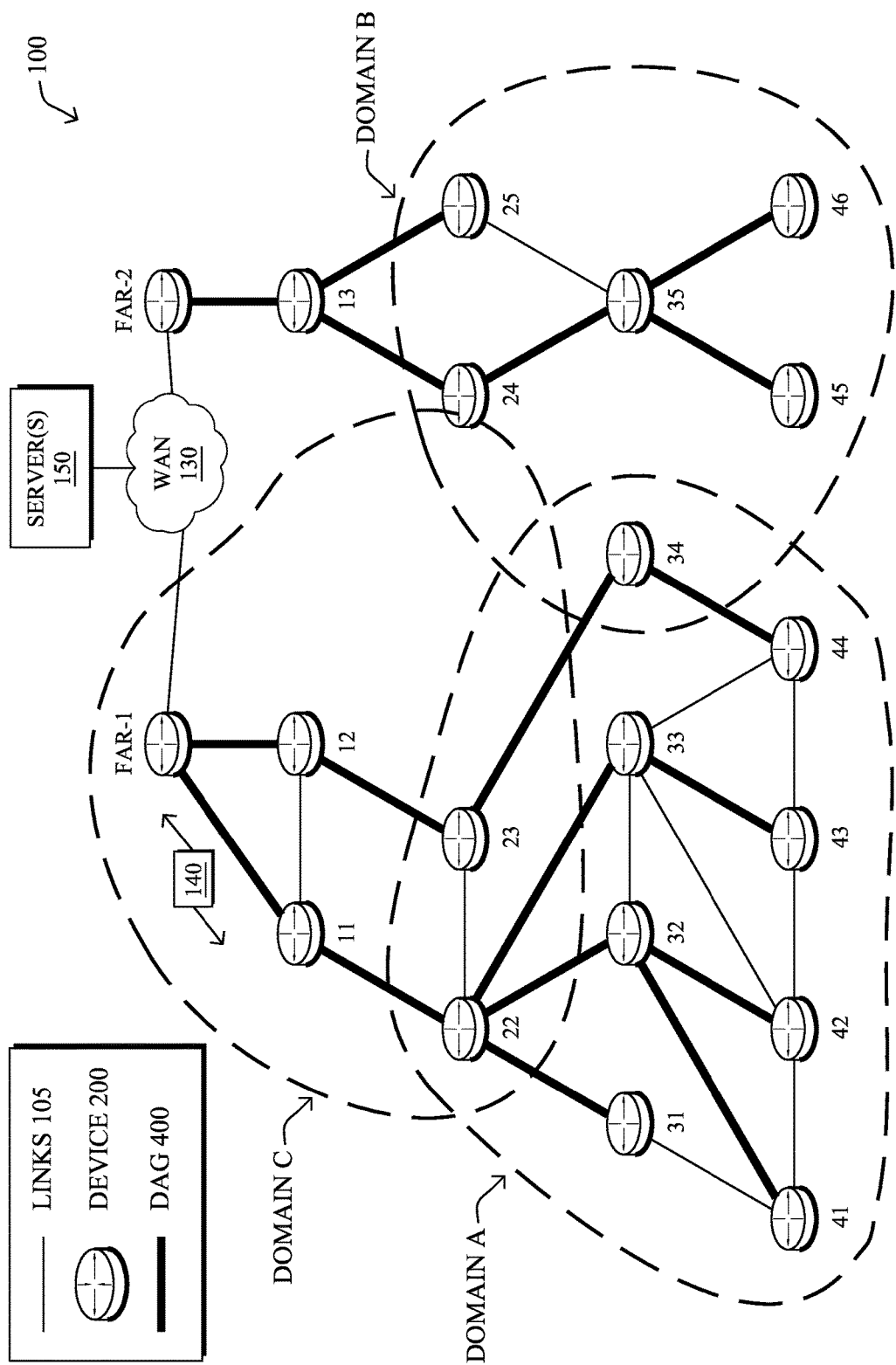
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
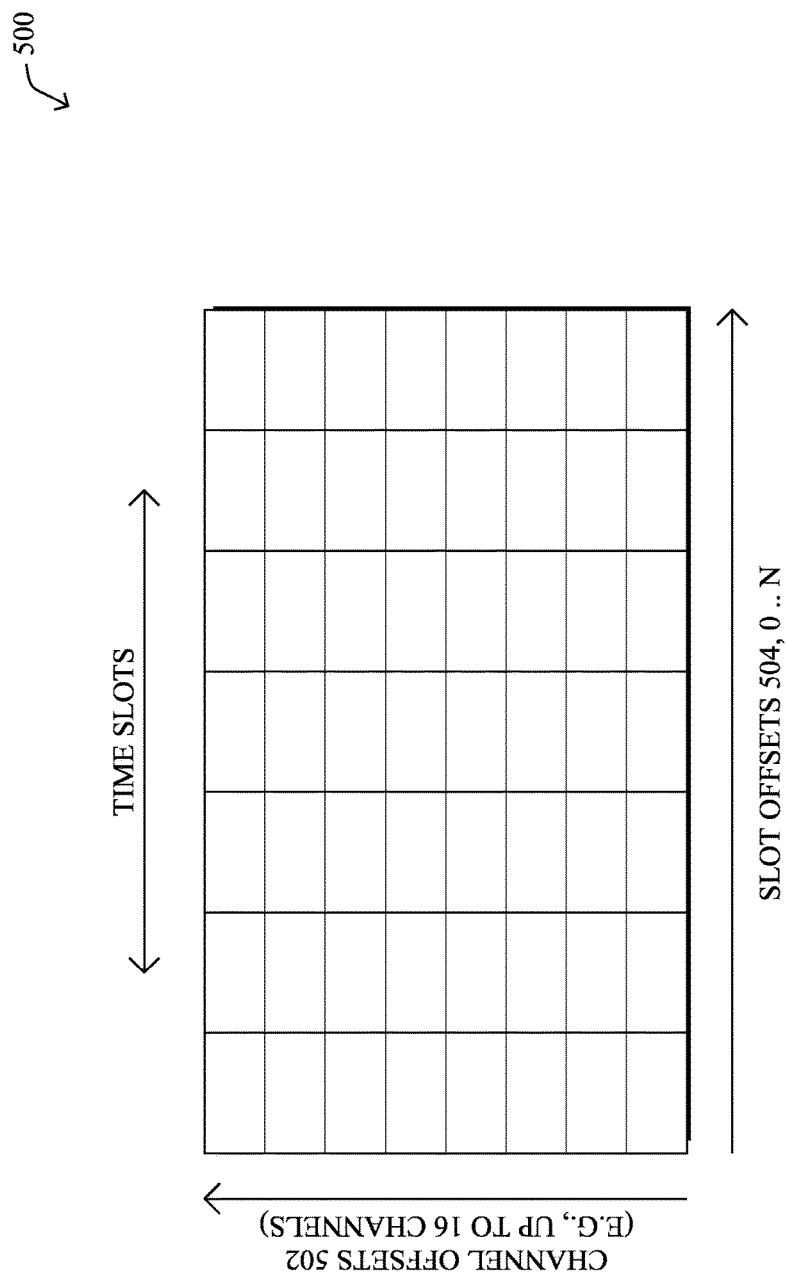
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
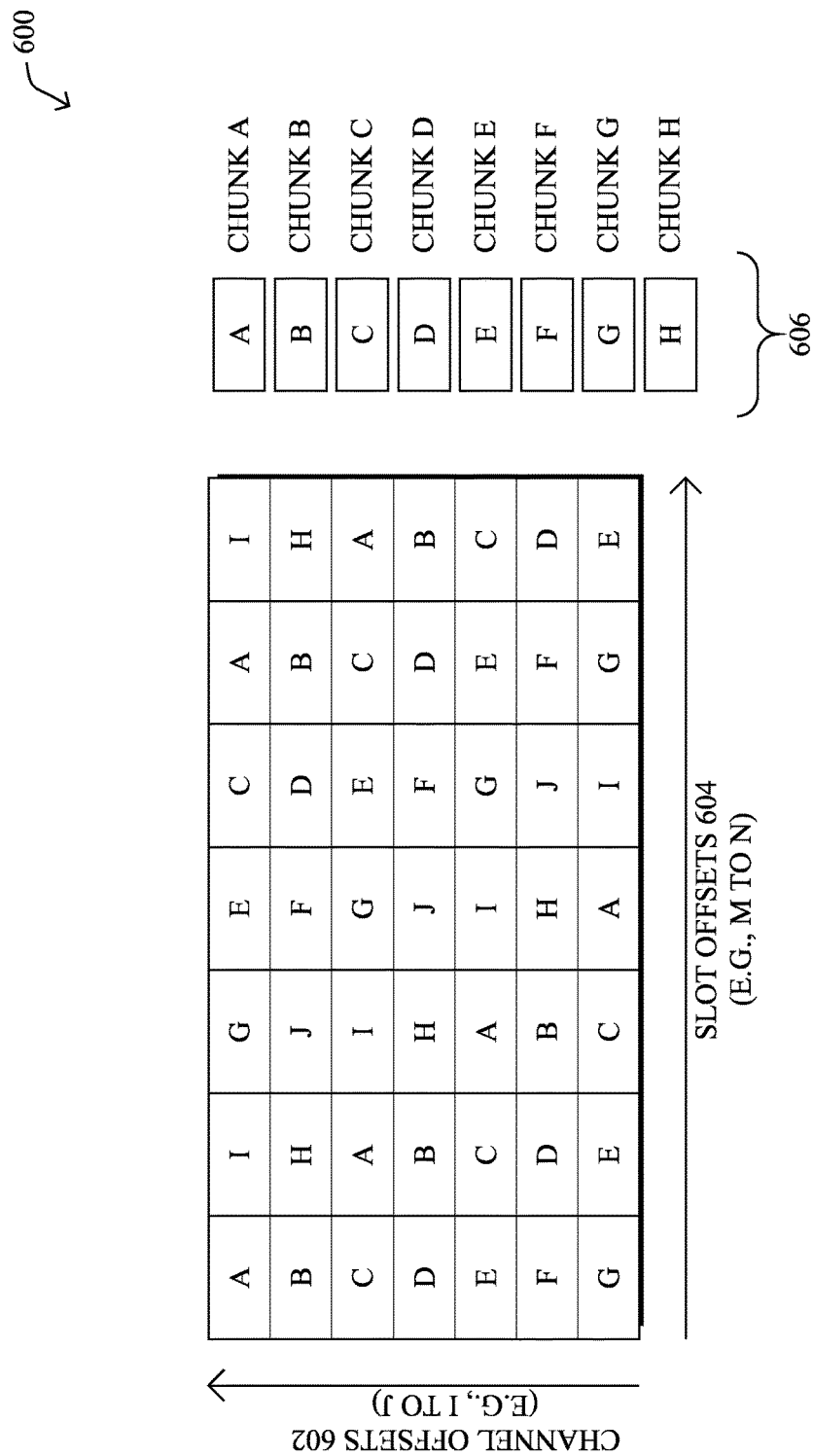
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
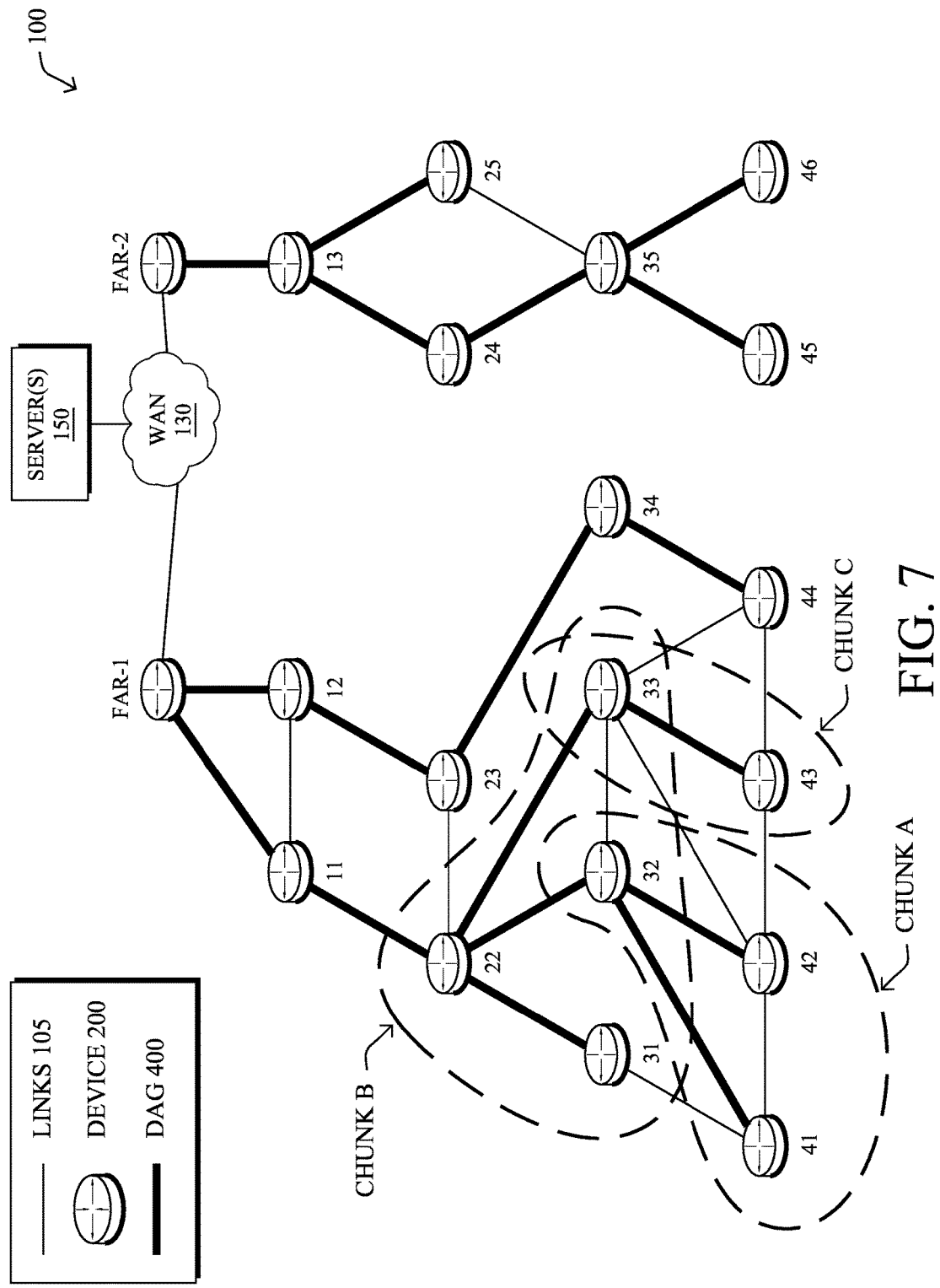
FIGS. 7-8 illustrate examples of a parent node in the network of FIG. 1 scheduling communications for a particular chunk.
Figure 8:
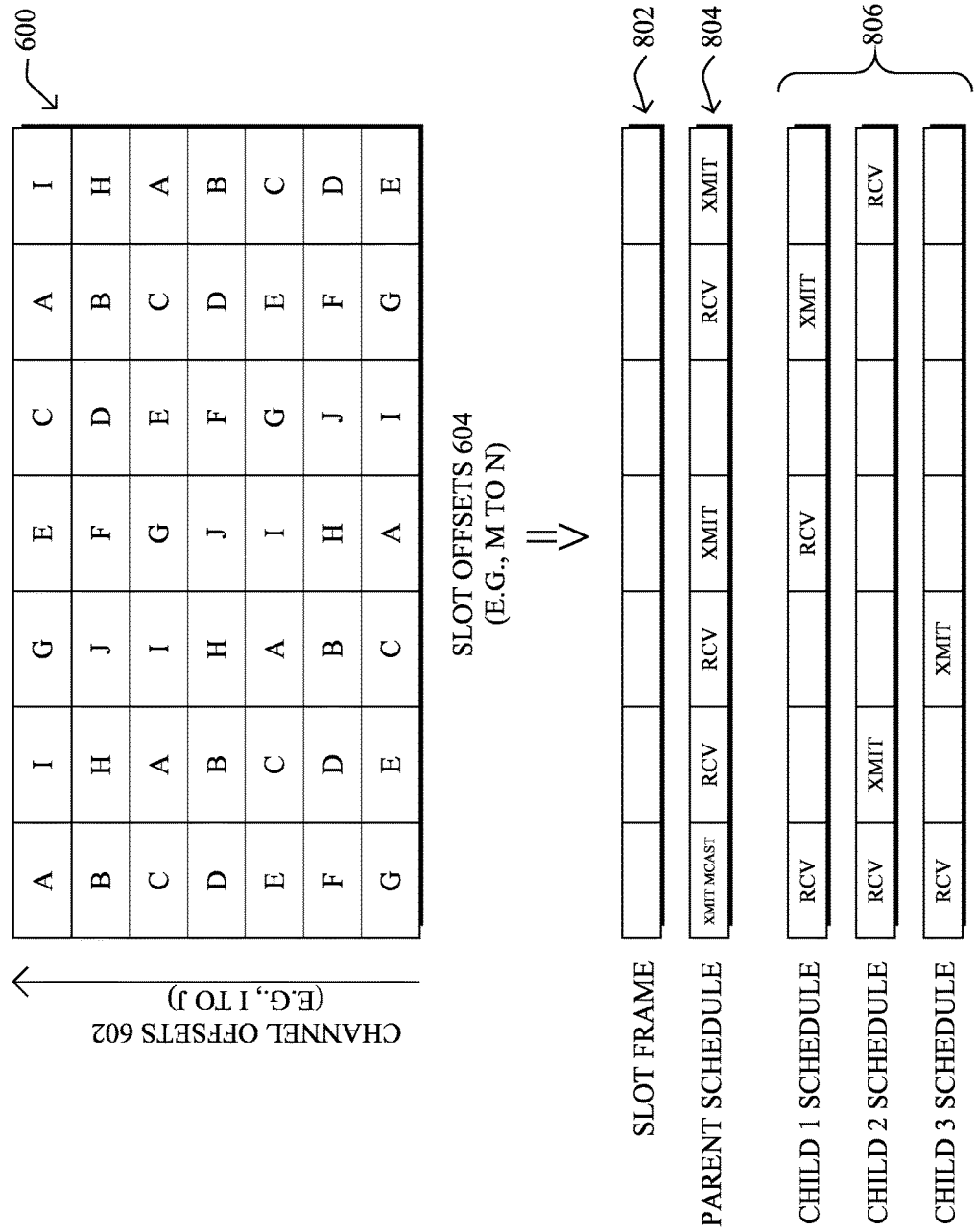

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. In other words, a 6TiSCH track may represent a given path in a network, with the successive cells/time slots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, routing protocols such as RPL may support two different modes of operation: 1.) a storing mode and 2.) a non-storing mode. In storing mode, each node provides information to its DAG parent(s) about the prefix(es)/address(es) that it owns. In response, each parent node then populates its routing table in support of downward routing. In the upward direction, traffic is sent along the DAG towards the Root node. In contrast, in non-storing mode, nodes only store information regarding their next hop parent(s) in support of the DAG. This allows for memory savings on intermediate nodes and is particularly suited to P2MP and MP2P traffic. Thus, in non-storing mode, traffic may be sent to the DAG Root for both upward-bound and downward-bound traffic. If the traffic is downward-bound, the DAG Root may then source route the traffic back into the LLN towards its destination node. Both storing and non-storing routing modes provide severe pros and cons in terms of their supported levels of determinism, required resources to provision, scalability, path optimizations, etc.

Time-Based Traffic Engineering for Seasonal Flows in a Network

The techniques herein allow for the use of time-based, traffic engineered paths in a deterministic network, such as a deterministic LLN. In some aspects, a machine learning engine may detect seasonality in traffic flows in the network (e.g., based on traffic reports/statistics). If a seasonal flow is detected, characteristics of the seasonal flow (e.g., degree of seasonality, traffic type, source, destination, etc.) may be extracted and compared against an SLA. If the SLA is not met, a time-based traffic engineered path may be provisioned in the network to support the seasonal flow. In various aspects, such a path may be provisioned by computing a new 6TiSCH track or using source routing.

Specifically, according to one or more embodiments of the disclosure as described in detail below, a device in a network receives information regarding one or more traffic flows in the network. The device identifies a particular one of the one or more traffic flows as a seasonal traffic flow based on the information regarding the one or more traffic flows. The device determines whether a service level agreement associated with the seasonal traffic flow is met. The device causes a time-based path for the seasonal traffic flow to be provisioned, in response to a determination that the service level agreement associated with the seasonal traffic flow is not met.

Illustratively, the techniques described herein may be performed by hardware, software, and/or firmware, such as in accordance with the seasonality handler process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a first aspect of the techniques herein relates to the collection of traffic information from the nodes in the network. In certain networks, such as those that use both 6TiSCH and RPL described above, packets may follow a path along the RPL DAG but also paths corresponding to TSCH tracks. To add determinism to these networks, a PCE may be employed to compute tracks that satisfy the strict SLA requirements of the deterministic network.

Figure 9A:
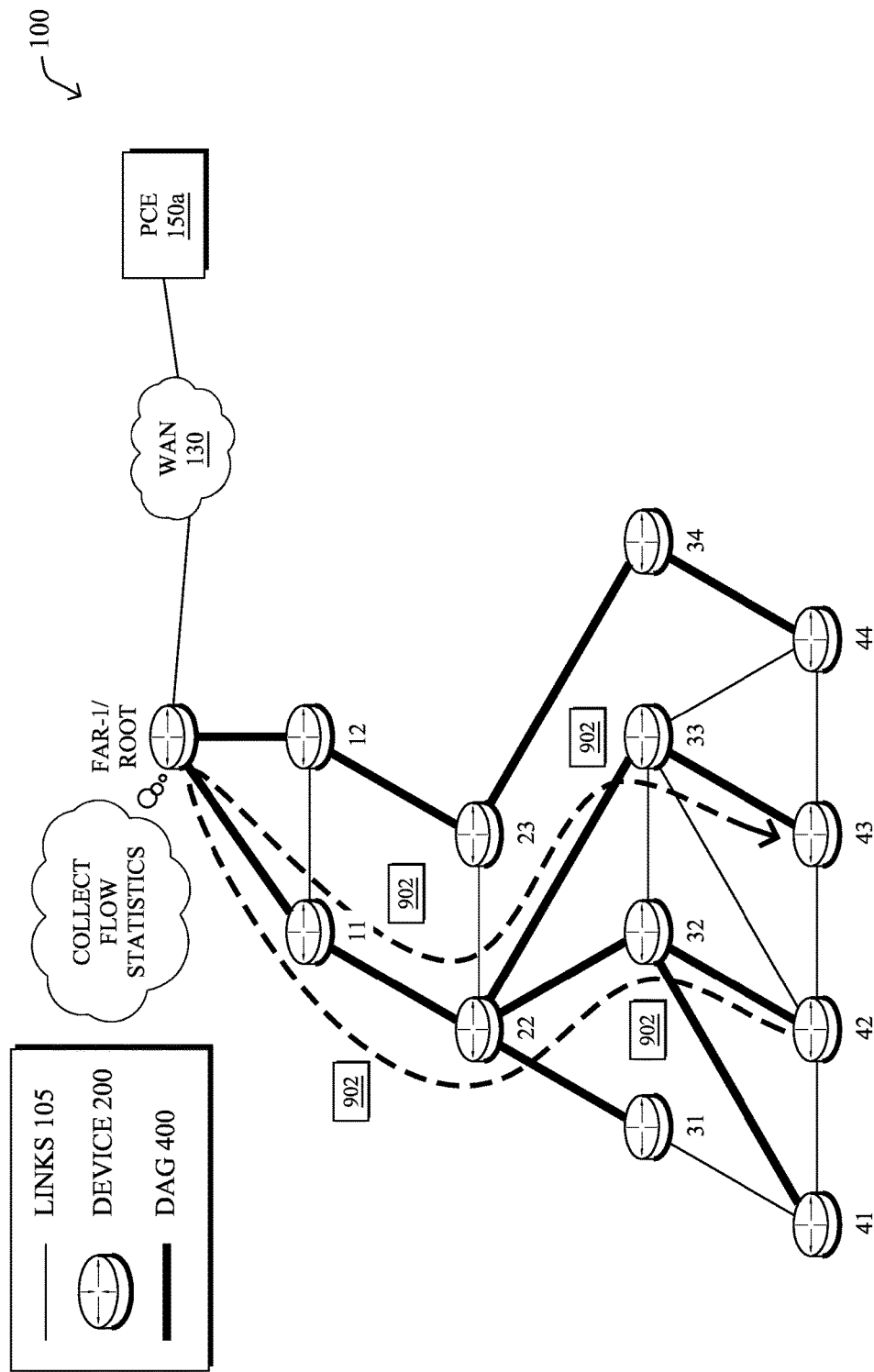
FIGS. 9A-9C illustrates examples of traffic flow information being collected in a network.
Figure 9B:
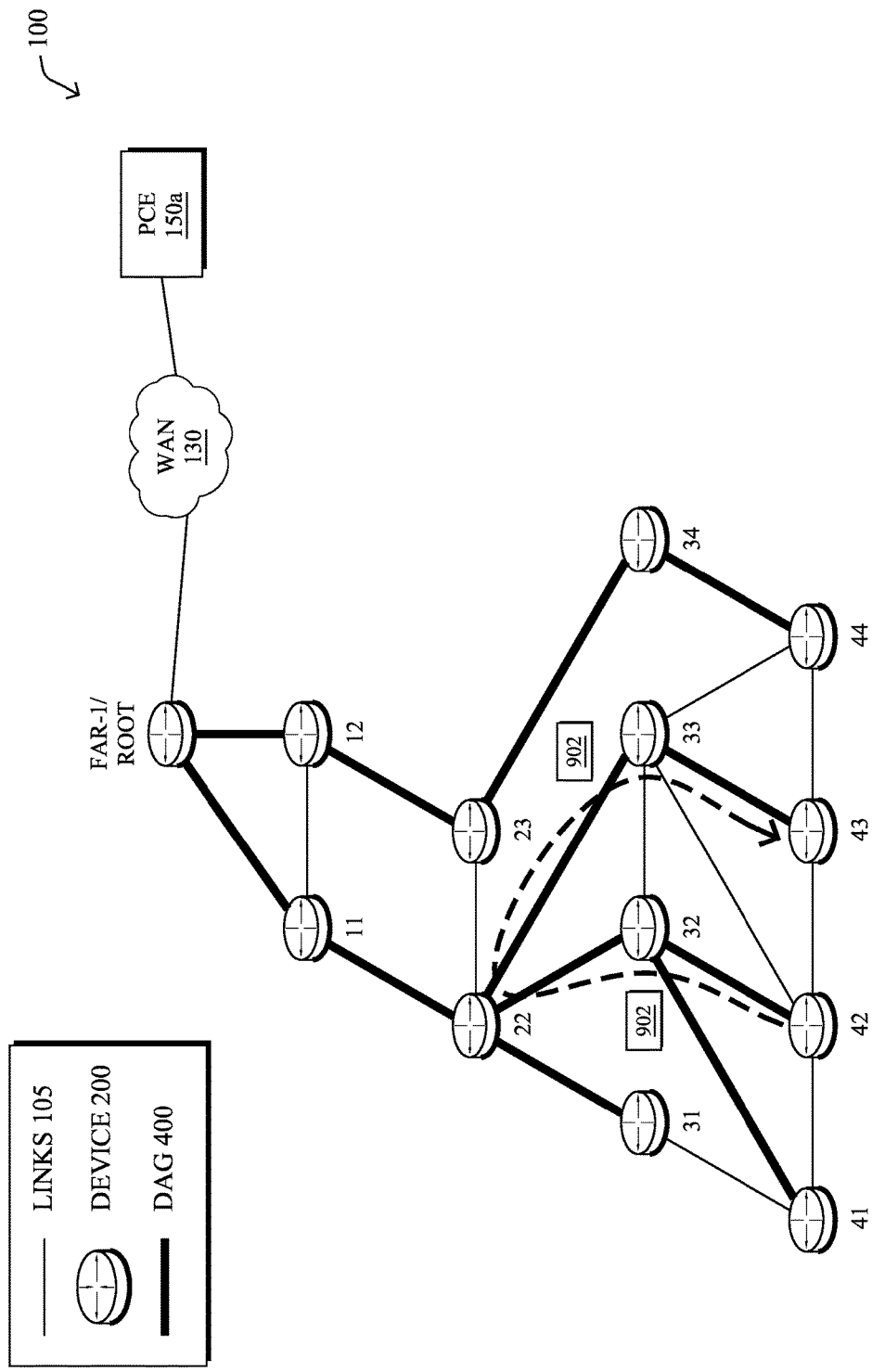
Figure 9C:
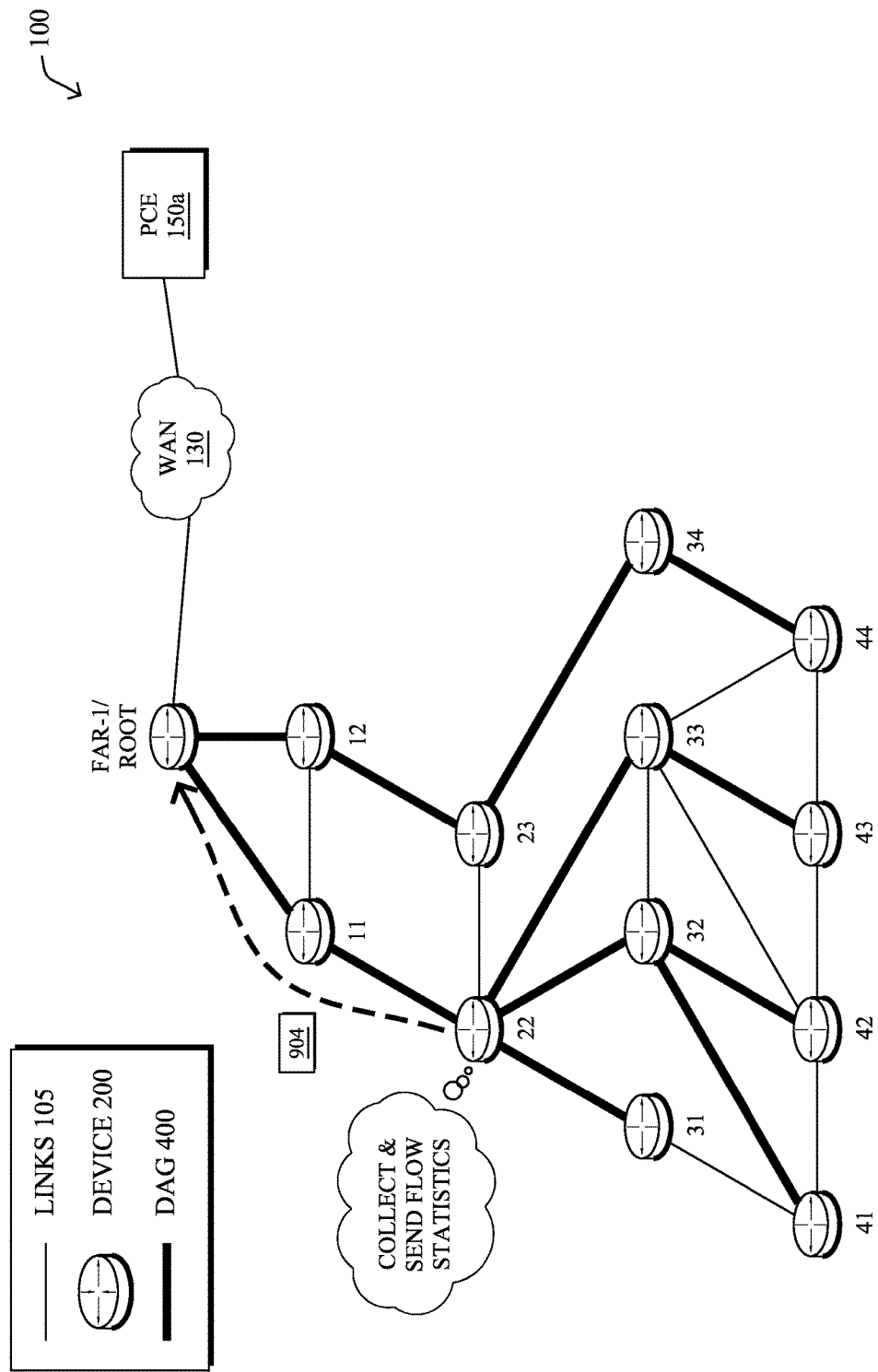

FIGS. 9A-9C illustrates examples of traffic flow information being collected in a network. In various embodiments, a supervisory networking device such as the DAG Root, a PCE (e.g., a PCE 150a in communication with the Root), or the like, may collect information regarding the traffic flows in network 100. Various approaches may be taken to collect the information, depending on the collecting device and the routing strategy used in the network (e.g., storing mode vs. non-storing mode, etc.).

As shown in FIG. 9A, an example is shown in which traffic flow statistics are collected when RPL is used in non-storing mode. In this example, assume that node 42 is sending packets/traffic flow 902 to node 43. In non-storing mode, all traffic is routed to the DAG Root via the constructed DAG 400, which then source routes the traffic to its destination. In some embodiments, the Root may capture information at this time regarding traffic flow 902. Note that the captured information may be raw information (e.g., information regarding the destination of the flow captured from packet headers, etc.) and/or computed statistics for the flow (e.g., averages, performance metrics over time, etc.). In further embodiments, the Root node may supplement any captured information with additional information about traffic flow 902 from other sources. For example, the Root may retrieve or otherwise receive information regarding the traffic type (e.g., priority, level of retransmission, etc.) from another device. An example mechanism to receive this additional information is the One Platform Kit (OnePK) Data Path Service Set (DPSS) from Cisco Systems, Inc.

In FIG. 9B, another example is shown in which the network is instead configured to use RPL in storing mode. In such cases, intermediary nodes may maintain routing state information in their routing tables and may redirect downward traffic as needed. For example, assume that node 22 is configured to operate in storing mode and that node 22 stores route information to node 43. In such a case, node 22 may opt to source route traffic flow 902 to node 43. Thus, in contrast to non-storing mode, traffic flow 902 is not routed all the way up to the Root and then back down to the destination node. Traffic sent in the upward direction (e.g., to one of servers 150, etc.) may be forwarded according to DAG 400, similar to non-storing mode.

As shown in FIG. 9C, the Root node or other device that collects traffic information from the network may receive the information from one or more of the distributed nodes in the network. In some cases, the information may be pushed to the collection device without first requesting the data. In other embodiments, a node may provide the information in response to receiving a request from the collection device. Such a request may indicate which information/statistics are requested, timing information to control when the information is sent, or any other configuration parameters that control when and how a given node reports traffic flow information to the Root. Consequently, the collection device may still receive traffic information even when storing mode is used in the network.

As shown, node 22 may provide collected traffic flow information and other statistics to the Root via a message 904. In general, message 904 may be a custom IPv4 or IPv6 message sent upon expiration of a timer by any of the nodes redirecting traffic downstream in storing mode. Message 904 may include any of the various traffic information/statistics that may otherwise be collected by the Root in non-storing mode. For example, message 904 may indicate the source and destination of traffic flow 902, jitter or delay information for traffic flow 902, or any other such information.

Figure 10A:
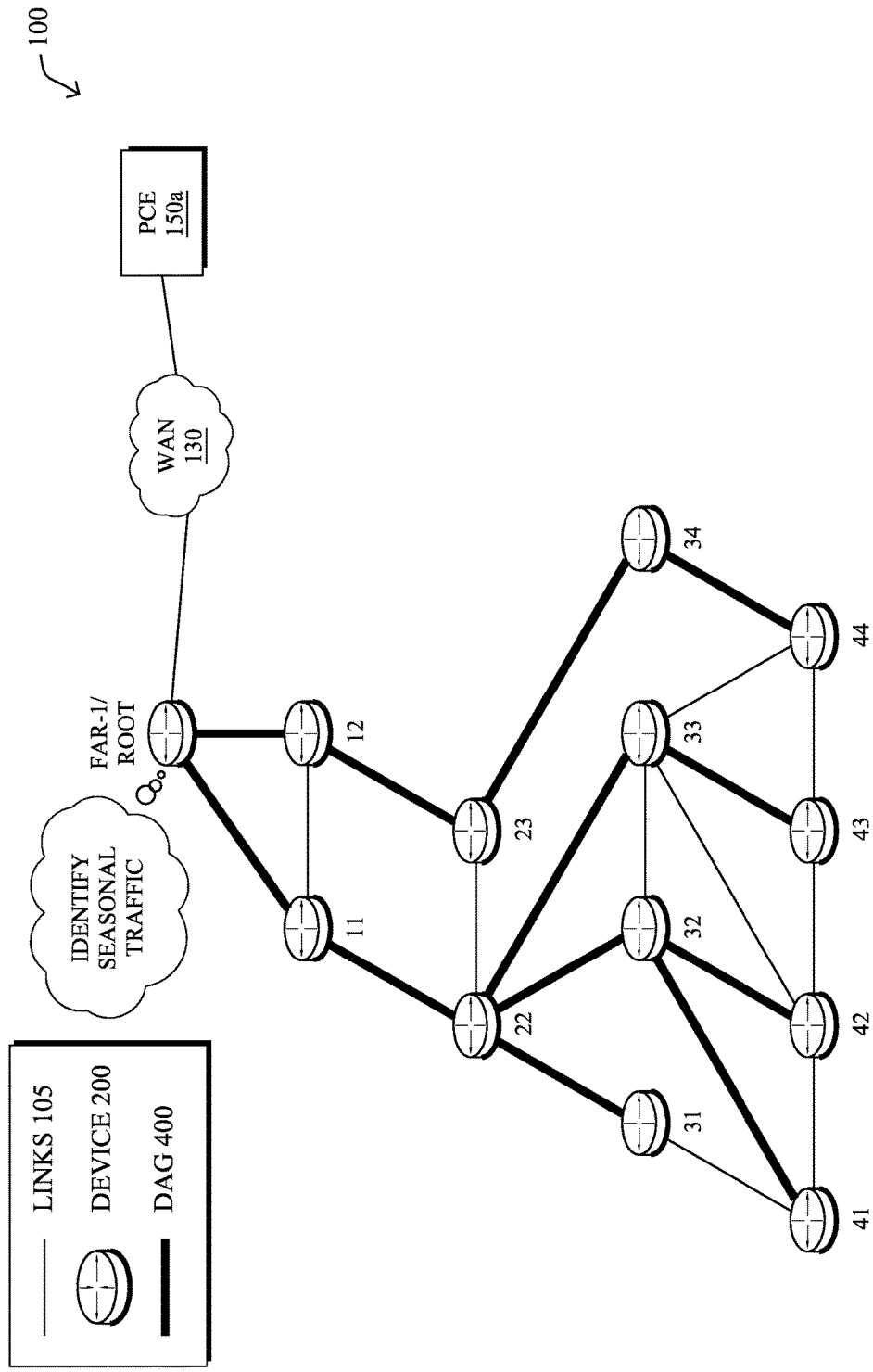
FIGS. 10A-10G illustrate examples of a time-based, traffic engineered path being provisioned for a seasonal traffic flow.
Figure 10B:
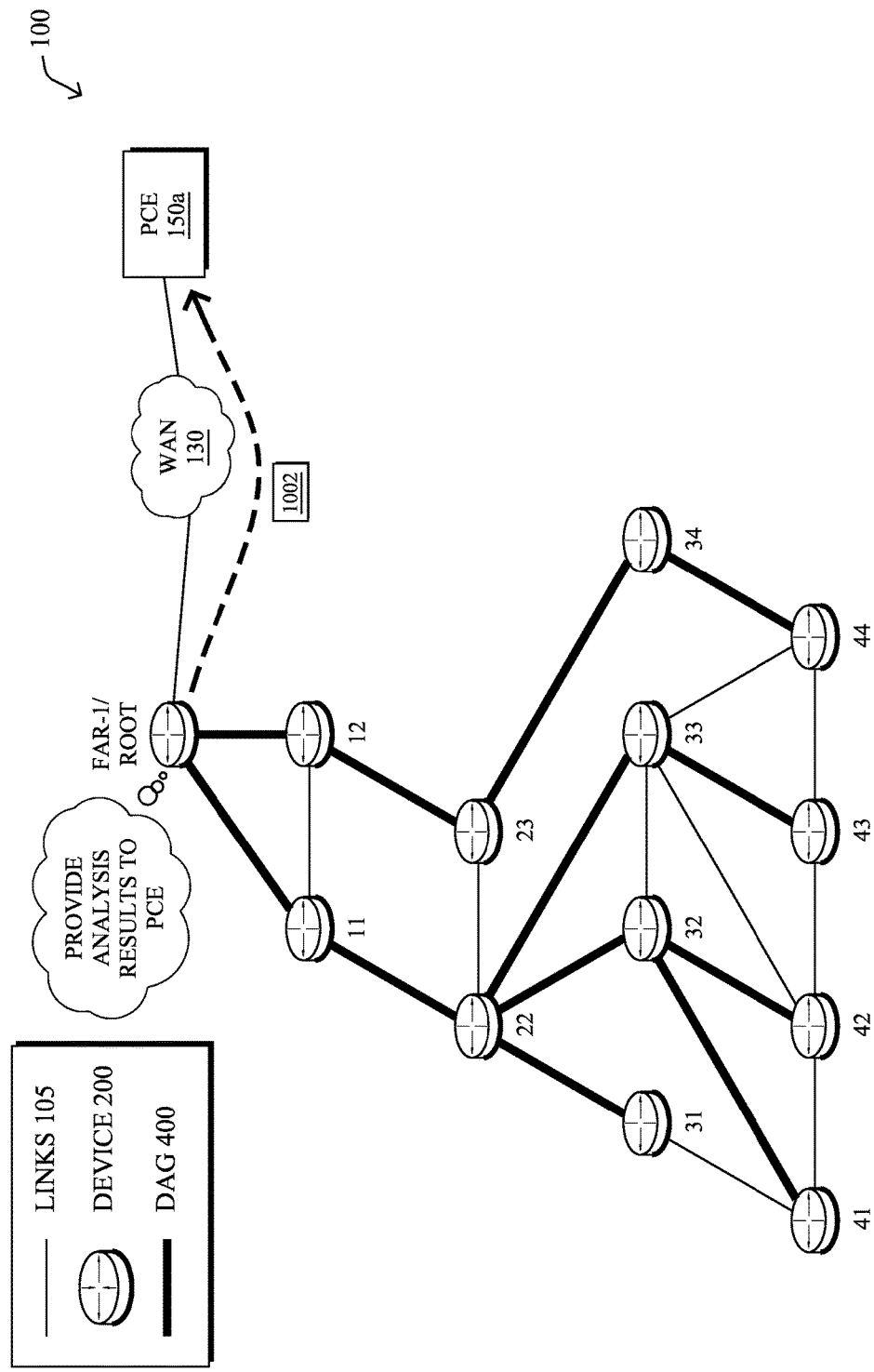

Referring now to FIGS. 10A-10G, examples are shown of a time-based, traffic engineered path being provisioned for a seasonal traffic flow. In another aspect of the techniques herein, the traffic flow information/statistics collected from the network may be used to identify seasonality in the traffic flows. For example, as shown in FIG. 10A, the Root node may determine whether traffic flow 902 is a seasonal traffic flow based on the locally collected traffic information (e.g., in non-storing mode), based on the reported traffic information from node 22 (e.g., in storing mode), or based on supplemental information received from another device.

According to various embodiments, the collected traffic information may be analyzed for seasonality using a machine learning engine (e.g., seasonality handler process 248), which may be co-hosted on the DAG Root, PCE 150a, or any other node in the network. Notably, the analysis may be performed by the device collecting the traffic flow information or the information may be forwarded to the analysis device, in various implementations.

During analysis, if not already provided, the device may compute statistics about the flows in the network. For example, the device may compute statistics for a flow regarding the amount of traffic, the source and destination of the flow, time(s) of the day the flow is present, flow durations, etc., and their respective statistical moments. These statistics may be sorted according to their respective source and destination, with the objective of determining the presence of seasonality. In various embodiments, the device may then determine seasonality of the flow using a machine learning technique such as a time series model (e.g., ARMA, ARIMA, etc.). Other machine learning models may be used in other embodiments.

The output of the machine learning engine may identify seasonal traffic and/or the corresponding characteristics of the seasonal flow (e.g., the seasonal time, amount of traffic, traffic type, etc.). In embodiments in which the analysis is performed by a device other than the PCE, the analyzing device may provide the seasonality information to the PCE. For example, as shown in FIG. 9B, the Root node may send a message 1002 that includes the results from the machine learning engine to the PCE.

For any given traffic flow, the PCE may associate any or all of the following information with the flow:

Seasonal flow characteristics identified by the machine learning engine (e.g., flow frequency, volume, statistical moments, etc.).

Flow characteristic (e.g., traffic type, source/destination, etc.).

Current path. In one embodiment, the PCE may obtain this information by polling the RPL DAG. Note that the actual path may be reconstructed by the DAG using the DAO information.

SLA information specified by a policy engine or other device that specifies the flow requirements in terms of delays, jitter, packet loss, etc.

Figure 10C:
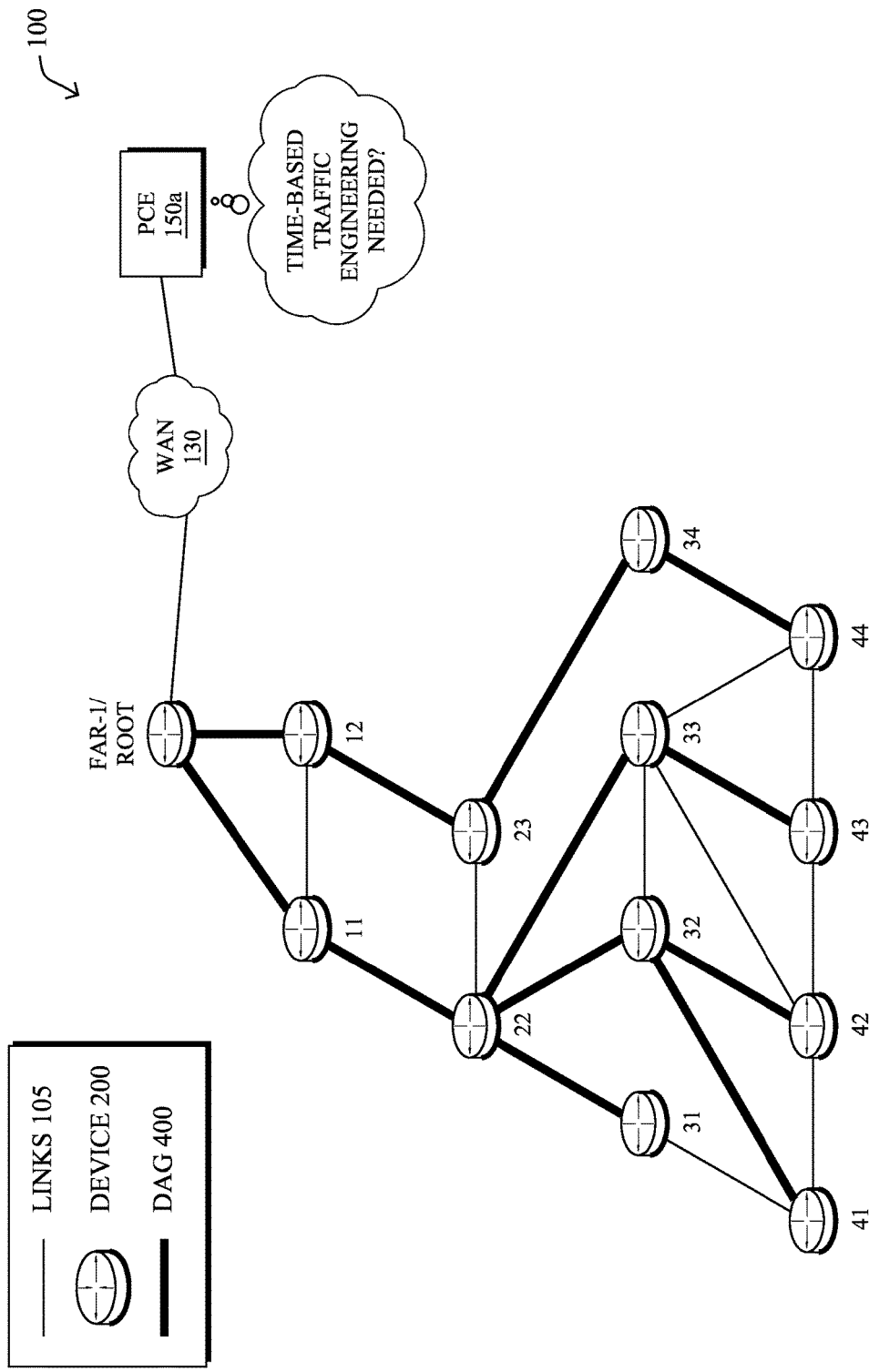

As shown in FIG. 10C, PCE 150a may use any or all of the above information to determine whether a time-based, traffic engineered path should be installed for a seasonal traffic flow. The PCE may use a number of criteria to make this determination. For example, PCE 150a may determine whether the characteristics of seasonal traffic flow 902 satisfy the required SLA for the traffic. PCE 150a may also apply any number of configurable rules, to determine whether a time-based, traffic engineered path is needed. For example, PCE 150a may compute a path if DSCP>X, the current path is sub-optimal by Y %, the current SLA is violated by more than Z %, and/or if the seasonality of the flow is within a predefined range.

Figure 10D:
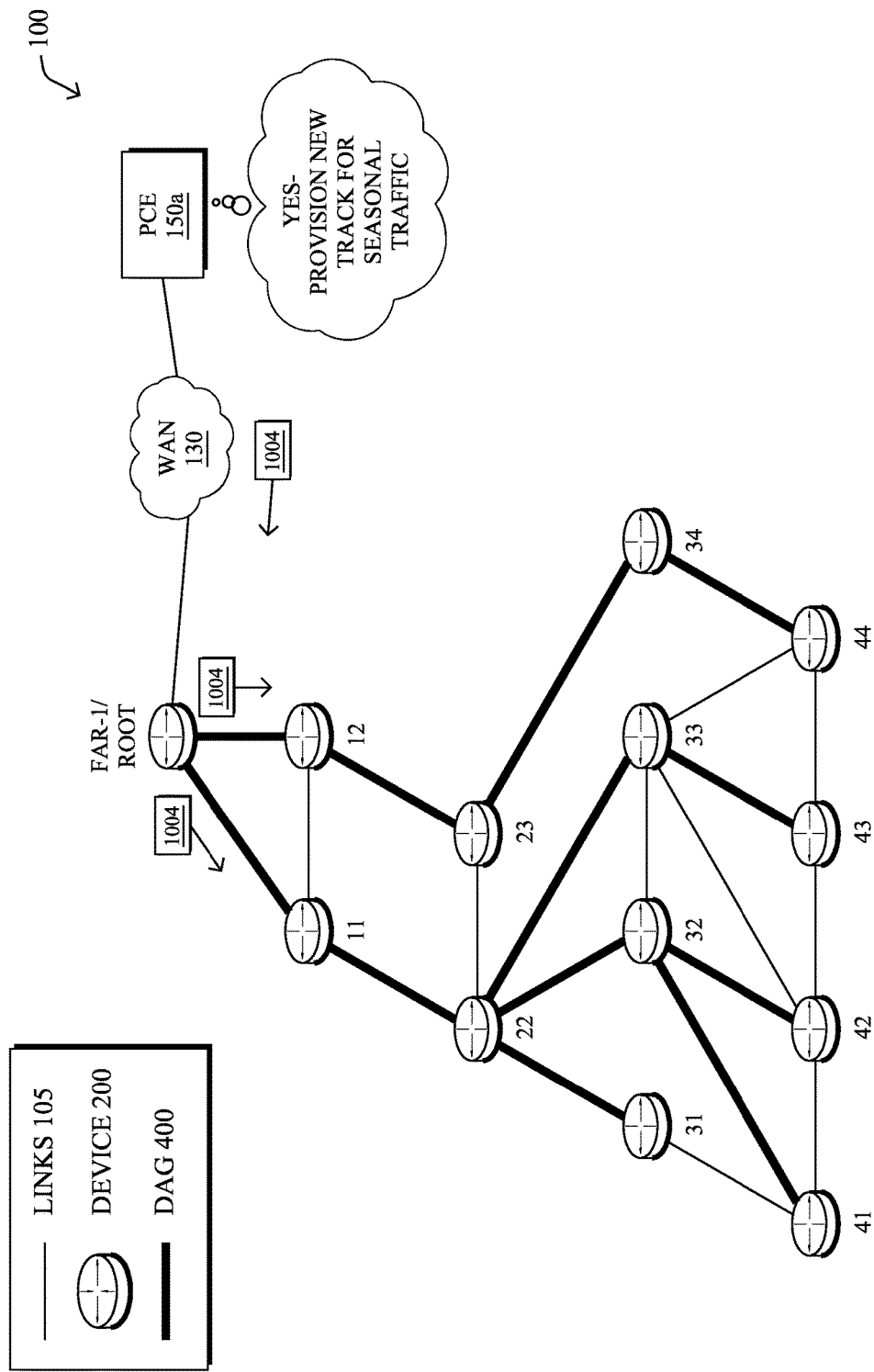
Figure 10E:
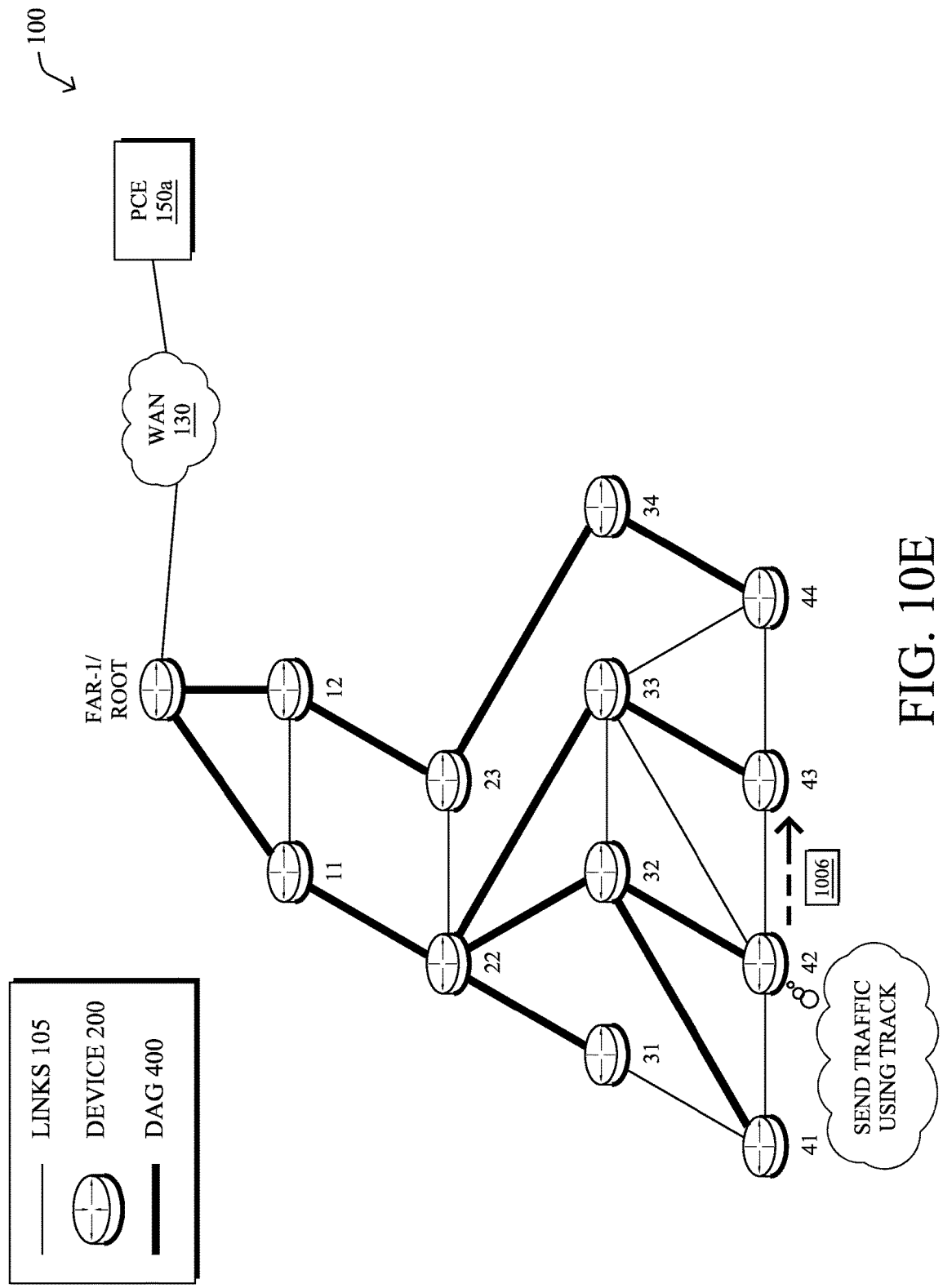

Further aspects of the techniques herein relate to the provisioning of a time-based, traffic engineered path for the seasonal traffic flow. In networks that use 6TiSCH or similar mechanisms, the PCE may compute the traffic engineered path as a new 6TiSCH track. For example, as shown in FIG. 10D, PCE 150a may compute a 6TiSCH track to support the seasonal traffic flow 902. In turn, PCE 150a may provision the new track at the nodes along the corresponding path via a message 1004. Message 1004 may be a custom message that may include the time-based information regarding the seasonal traffic. For example, the PCE may instruct the nodes along the nodes to route seasonal traffic between a source and destination, of traffic type T (e.g., DSCP=DSCPi), at specific times and/or for a specific period of time (e.g., an active time period for the path). In turn, as shown in FIG. 10E, the instructed node(s) may forward the traffic according to the computed track and the received instructions. In some embodiments, when outside of the active time period, the node may forward traffic according to the RPL-based paths, otherwise.

Figure 10F:
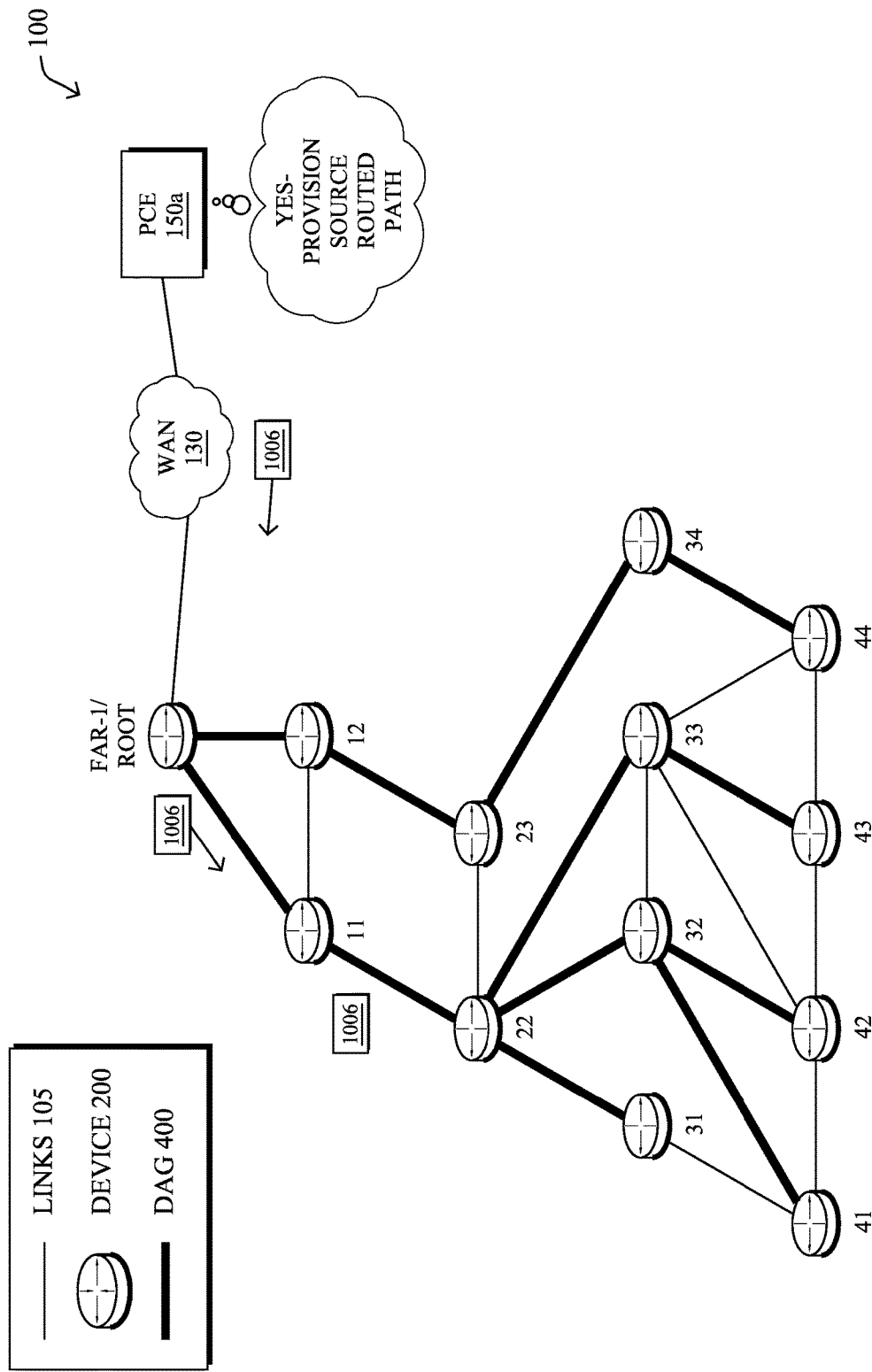
Figure 10G:
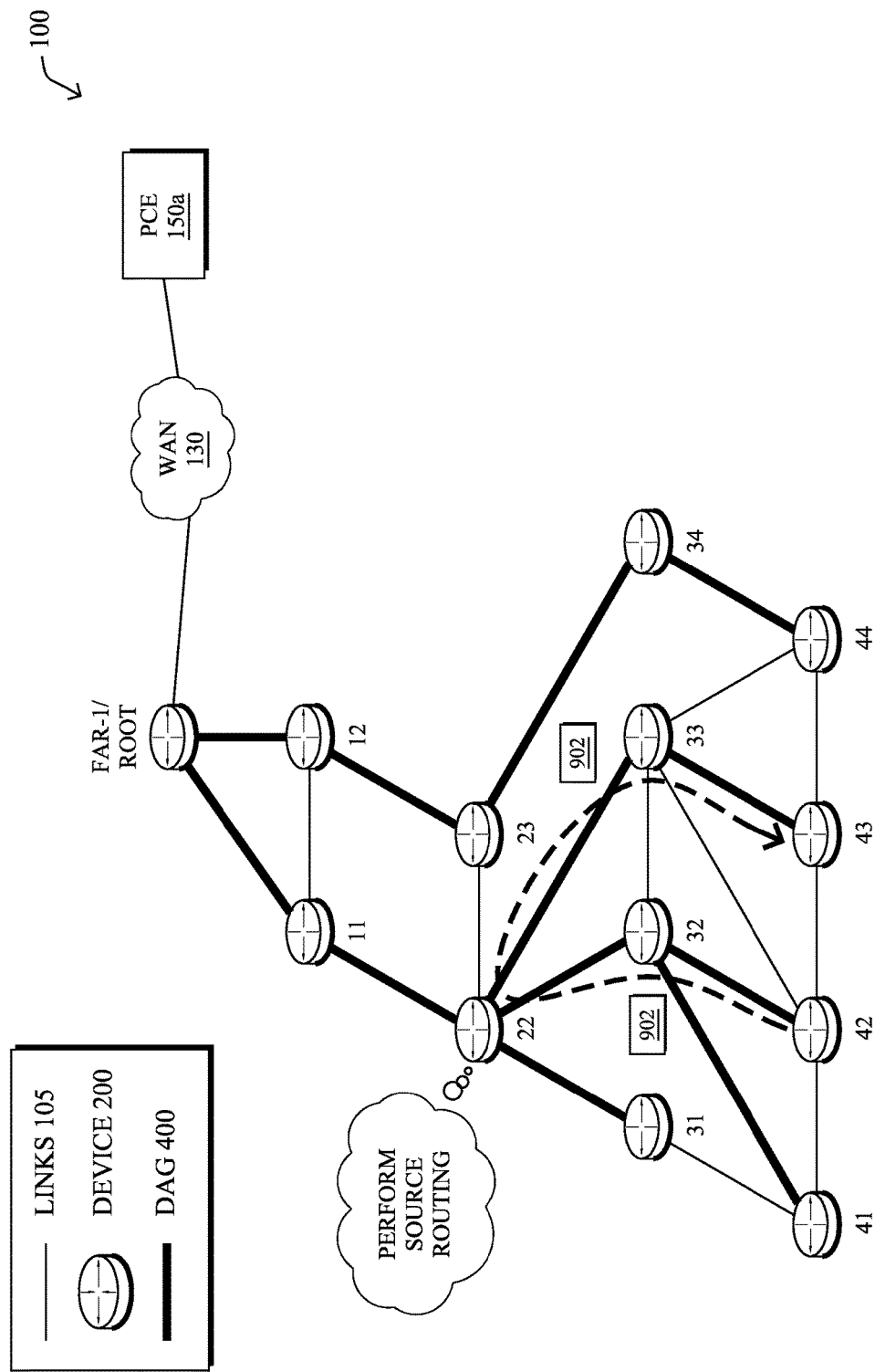

In further embodiments, the PCE may decide not to route the seasonal traffic over a track, but instead use a source routed, RPL path. For example, as shown in FIG. 10F, PCE 150a may compute a source routed path for the identified seasonal traffic flow 902. In some cases, the PCE may provision the source routed path at a chosen node along the path via an instruction message 1006. In one embodiment, instruction message 1006 may instruct the source of the traffic to source route the traffic to the destination. In further embodiments, the PCE may decide to provision the source route segment on an intermediate node along the computed path, such as in the case of non-storing mode. For example, as shown in FIG. 10G, assume that PCE 150a provisions a source route at node 22 for seasonal traffic flow 1006 sent from node 42 to node 43. In such a case, traffic flow 1006 may be forward up the default RPL DAG 400 up to node 22, where the traffic is then source routed downward.

Figure 11:
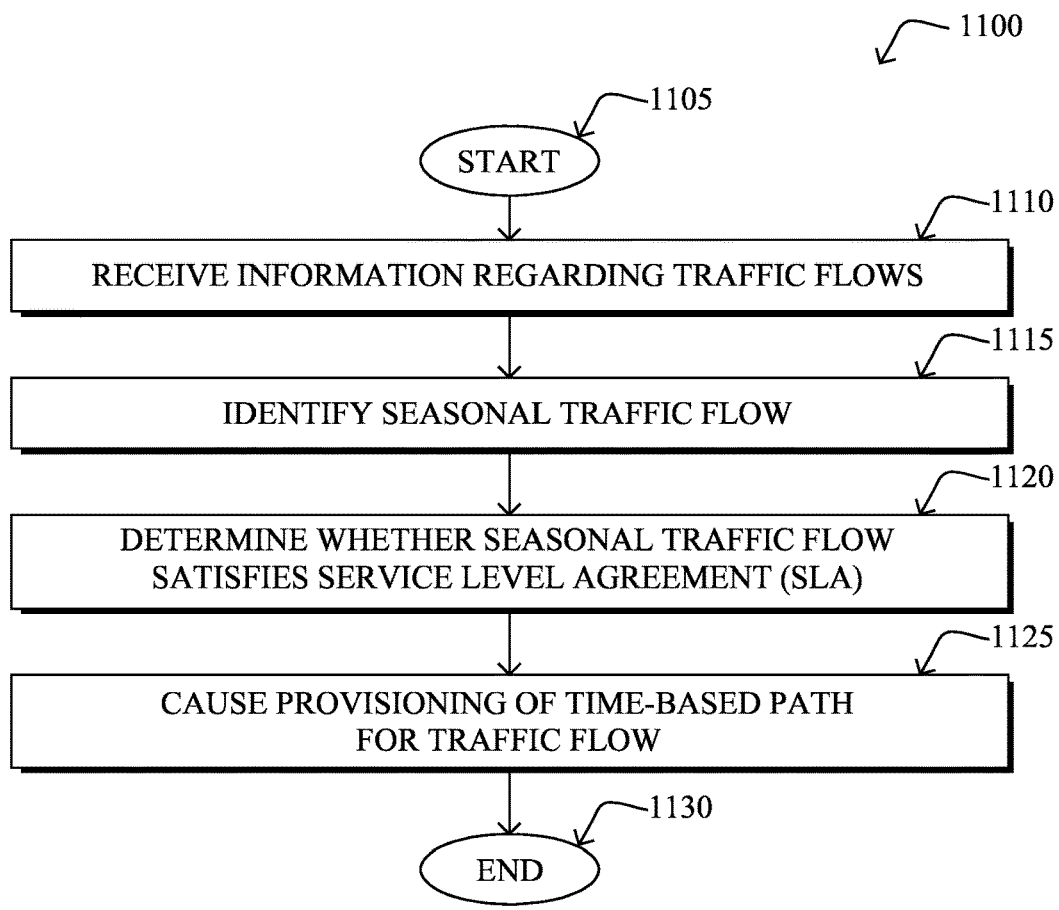
FIG. 11 illustrates an example simplified procedure for causing a time-based, traffic engineered path to be provisioned for a seasonal traffic flow.

FIG. 11 illustrates an example simplified procedure for causing a time-based, traffic engineered path to be provisioned for a seasonal traffic flow, in accordance with one or more embodiments described herein. The procedure 1100 may start at step 1105, and continues to step 1010, where, as described in greater detail above, a device in a network receives information regarding one or more traffic flows in the network. In various embodiments, the device may receive the flow information by analyzing traffic flowing through the device. For example, a DAG Root may analyze traffic routed through the Root. In further embodiments, the device may receive the traffic flow information from one or more other nodes in the network. For example, an intermediary node along the path used by a traffic flow may forward collected information regarding the flow to the DAG root or other device. In another example, the device may be a PCE that receives the traffic flow information from the DAG root or any other device in the network.

Generally, the received traffic flow information may include any observed information regarding a particular traffic flow and/or any measurements derived therefrom (e.g., statistics, etc.). For example, the received traffic flow information may include an indication of the source of the flow, the destination of the flow, the traffic volume or size of the flow, the flow duration, the time(s) at which the flow was sent, performance characteristics of the flow (e.g., jitter, dropped packets, delays, etc.), the type of traffic in the flow (e.g., DSCP data, etc.), combinations thereof, or the like.

At step 1115, as detailed above, the device may identify a particular one of the traffic flows as seasonal. In other words, the device may determine whether the flow occurs on a regular basis at certain times. In various embodiments, the device may use machine learning (e.g., a time series, etc.), to determine a measure of the seasonality of the particular traffic flow. For example, assume that the traffic flow appears in the network every Sunday at 2:00 PM. By analyzing the received information regarding the flow using a machine learning process, the device may identify the flow as seasonal and/or quantify how seasonal the traffic flow is. In other embodiments, the actual seasonality analysis may be performed by another node in the network. For example, if the device is a PCE, it may identify the flow as seasonal based on data received from the DAG Root or other device that performs the machine learning-based analysis of the seasonality.

At step 1120, the device may determine whether the identified seasonal traffic flow satisfies a service level agreement (SLA), as described in greater detail above. Generally, an SLA guarantees a minimum level of performance for a traffic flow. For example, an SLA may define an expected level of network performance in terms of delays, jitter, packet drops, etc. In some embodiments, the device may determine whether or not the performance of the seasonal traffic flow satisfies one or more rules (e.g., based on the SLA), such as the traffic violating the SLA by a certain percentage, etc.

At step 1125, as detailed above, the device may cause a time-based path to be provisioned in the network for the seasonal traffic flow. In one embodiment, the device may calculate and provision a new 6TiSCH track on the nodes along the corresponding path. In other embodiments, the device may provision the path by instructing one or more nodes along the path to use source routing. The path itself may be time-based, meaning that the nodes along the path may only use the path at predefined times (e.g., according to the seasonality of the traffic). Outside of this active period, the nodes may forward traffic using other paths, such as the default, routing protocol-based path (e.g., according to the RPL DAG, etc.). In some embodiments, the device may create a "virtual" schedule of schedules (e.g., a meta-schedule) whereby various schedules are active or inactive, depending on time. Notably, in TSCH networks, an active schedule is represented by a slotframe, which may be associated with a time period during which the slotframe is active. Multiple TSCH slotframes can also co-exist in a network and may be sorted by priority during use. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for seasonal traffic flows to be detected automatically and time-based, traffic engineered paths to be provisioned in the network to support the seasonal flows. In some aspects, the techniques herein may use machine learning to identify the seasonal traffic flows, which may be difficult to detect otherwise. Such techniques are particularly valuable in LLN and other mesh networks, as constructed DAG trees are not stable.

While there have been shown and described illustrative embodiments that provide for the provisioning of time-based, traffic engineered paths for seasonal traffic flows, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, such as RPL and 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in a network, information regarding one or more traffic flows in the network;
    identifying, by a learning machine executing on the device, a particular one of the one or more traffic flows as a seasonal traffic flow based on the information regarding the one or more traffic flows, wherein a seasonal traffic flow is a traffic flow that only appears at certain times in the network;
    determining, by the device, whether a threshold in a service level agreement associated with the seasonal traffic flow is met;
    in response to a determination that the threshold in the service level agreement associated with the seasonal traffic flow is not met, dynamically enabling, by the device, a time-based path for the seasonal traffic flow to be provisioned, wherein enabling includes instructing a node along the time-based path to use source routing for the seasonal traffic flow during an active time period for the path and to route traffic via a second path in the network determined using a Routing Protocol for Low Power and Lossy Networks (RPL) Protocol when outside of the active time period; and
    wherein an intermediate node uses the RPL Protocol in non-storing mode.

2. The method as in claim 1, wherein causing the time-based path for the seasonal traffic flow to be provisioned comprises:
    determining a time slotted channel hopping schedule for nodes along the time-based path for the seasonal traffic flow; and
    instructing nodes along the time-based path to use the time slotted channel hopping schedule.

3. The method as in claim 2, wherein the time slotted channel hopping schedule comprises a 6TiSCH track associated with the time-based path.

4. The method as in claim 3, further comprising:
    causing a plurality of time slotted channel hopping schedules to be provisioned as 6TiSCH slotframes, wherein each of the slotframes is associated with a different time period during which a particular one of the plurality of time slotted channel hopping schedules is active in the network.

5. The method as in claim 2, wherein instructing nodes along the time-based path to use the time slotted channel hopping schedule comprises:
    determining the active time period for the path based on the seasonal traffic flow
    causing the nodes along the time-based path to route traffic along the path during the active time period and along the second path in the network when outside of the active time period.

6. The method as in claim 1, wherein the node along the time-based path is the intermediate node along the path between a source and destination of the seasonal traffic.

7. The method as in claim 1, wherein identifying the seasonal traffic flow comprises:
    analyzing, by the learning machine, the information regarding the one or more traffic flows using a machine learning process configured to detect seasonality.

8. An apparatus, comprising:
    one or more network interfaces to communicate with a network;

a processor coupled to the network interfaces and adapted to execute one or more processes; and a memory configured to store a process executable by the processor, the process when executed configured to:

receive information regarding one or more traffic flows in the network;

identify, by a learning machine process, a particular one of the one or more traffic flows as a seasonal traffic flow based on the information regarding the one or more traffic flows, wherein a seasonal traffic flow is a traffic flow that only appears at certain times in the network;

determine whether a threshold in a service level agreement associated with the seasonal traffic flow is met;

in response to a determination that the threshold in the service level agreement associated with the seasonal traffic flow is not met, enable a time-based path for the seasonal traffic flow to be provisioned, wherein enabling includes instructing a node along the time-based path to use source routing for the seasonal traffic flow during an active time period for the path and to route traffic via a second path in the network determined using a Routing Protocol for Low Power and Lossy Networks (RPL) Protocol when outside of the active time period; and an intermediate node uses the RPL Protocol in non-storing mode.

9. The apparatus as in claim 8, wherein the apparatus causes the time-based path for the seasonal traffic flow to be provisioned by:

determining a time slotted channel hopping schedule for nodes along the time-based path for the seasonal traffic flow; and instructing nodes along the time-based path to use the time slotted channel hopping schedule.

10. The apparatus as in claim 9, wherein the time slotted channel hopping schedule comprises a 6TiSCH track associated with the time-based path.

11. The apparatus as in claim 9, wherein the apparatus instructs the nodes along the time-based path to use the time slotted channel hopping schedule by:

determining an active time period for the path based on the seasonal traffic flow; and causing the nodes along the time-based path to route traffic along the path during the active time period and along the second path in the network when outside of the active time period.

12. The apparatus as in claim 11, wherein the node along the time-based path is the intermediate node along the path between a source and destination of the seasonal traffic.

13. The apparatus as in claim 8, wherein the apparatus identifies the seasonal traffic flow by:

analyzing the information regarding the one or more traffic flows using a machine learning process configured to detect seasonality.

14. A tangible, non-transitory, computer-readable media having software encoded thereon, the software when executed by a processor configured to:

receive information regarding one or more traffic flows in the network;

identify, by a learning machine process, a particular one of the one or more traffic flows as a seasonal traffic flow based on the information regarding the one or more traffic flows, wherein a seasonal traffic flow is a traffic flow that only appears at certain times in the network;

determine whether a threshold in a service level agreement associated with the seasonal traffic flow is met;

in response to a determination that the threshold in the service level agreement associated with the seasonal traffic flow is not met, enable a time-based path for the seasonal traffic flow to be provisioned, wherein enabling includes instructing a node along the time-based path to use source routing for the seasonal traffic flow during an active time period for the path and to route traffic via a second path in the network determined using a Routing Protocol for Low Power and Lossy Networks (RPL) Protocol when outside of the active time period; and an intermediate node uses the RPL Protocol in non-storing mode.

15. The computer-readable media as in claim 14, wherein the software when executed is further configured to:

determine a time slotted channel hopping schedule for nodes along the time-based path for the seasonal traffic flow; and instruct nodes along the time-based path to use the time slotted channel hopping schedule.

* * * * *